Dec. 10, 1968    E. C. ADAMS, JR., ET AL    3,415,361
TEST DEVICE AND CONTAINER THEREFOR
Filed Dec. 22, 1966    4 Sheets-Sheet 1

INVENTORS
KEITH WAYNE CHAMBLISS
MARGARET R. WEISS
BARBARA E. LOUGHMAN
ERNEST C. ADAMS, JR.
JAMES G. BEENY, JR.

BY *Gary L. Jordan*
ATTORNEY

Dec. 10, 1968   E. C. ADAMS, JR., ET AL   3,415,361
TEST DEVICE AND CONTAINER THEREFOR
Filed Dec. 22, 1966   4 Sheets-Sheet 3

INVENTORS
KEITH WAYNE CHAMBLISS
MARGARET R. WEISS
BARBARA E. LOUGHMAN
ERNEST C. ADAMS, JR.
JAMES G. BEENY, JR.
BY *Gary L. Jordan*
ATTORNEY Dec. 10, 1968 E. C. ADAMS, JR., ET AL 3,415,361
TEST DEVICE AND CONTAINER THEREFOR
Filed Dec. 22, 1966 4 Sheets-Sheet 4

INVENTORS
KEITH WAYNE CHAMBLISS
MARGARET R. WEISS
BARBARA E. LOUGHMAN
ERNEST C. ADAMS, JR.
JAMES G. BEENY, JR.
BY *Gary L. Jordan*
ATTORNEY

United States Patent Office 3,415,361
Patented Dec. 10, 1968

3,415,361
TEST DEVICE AND CONTAINER THEREFOR
Keith Wayne Chambliss, Margaret Rozman Weiss, Barbara Evers Loughman, and Ernest Clarence Adams, Jr., Elkhart, and James Gilbert Beeny, Jr., South Bend, Ind., assignors to Miles Laboratories, Inc., Elkhart, Ind., a corporation of Indiana
Filed Dec. 22, 1966, Ser. No. 604,046
19 Claims. (Cl. 206—47)

ABSTRACT OF THE DISCLOSURE

The disposable test device includes a receptacle and a corresponding closure member which is pivotable into a closed position over said receptacle to provide a closed reaction vessel. Any necessary chemical reagents for the test are carried by the receptacle and/or the closure member and in use a liquid test sample is added directly to said receptacle prior to closing of said closure member. The device may include support means for supporting said receptacle in an upright position on a flat surface.

Background of the invention

This invention relates to a test device which includes a container in which at least one dry or semi-solid test material is stored and has particular reference to a low cost test device which contains the necessary testing reagents for conducting chemical or immunological tests and which is adapted to receive samples of substances to be tested.

The prior commercially available means for conducting simple chemical and immunological tests have involved separately packaged, pre-measured quantities of individual tests reagents and mixing vessels, often in the form of small test tubes. In use the pre-measured reagents were added to the reaction vessel in a predetermined sequence and then an aliquot portion of a sample to be tested was added to the reaction vessel, after which a determination was made as to the occurrence or extent of an expected reaction. Some prior commercial test devices required the less convenient alternative of measuring the quantities of the test reagents as needed in conducting the particular test. These necessary manipulative steps lent such complexity to those prior commercial tests that testing was time-consuming and necessitated a high skill level. Generally such prior art tests were marketed in individual packages containing a multiplicity of reaction vessels, supportive equipment, and the necessary test reagents. Such tests were expensive to mass produce, package, ship, and use, and for these reasons they have not been commercially acceptable.

In view of the above it is an object of the present invention to provide a test device including a container in which pre-measured quantities of reactants for a chemical or immunological test are stored ready for use, said container being adapted to provide a reaction vessel for the test and to permit observation of visible changes indicating the occurence of and/or the extent of the reaction caused by the introduction thereinto of an aliquot sample of fluid to be tested, whereby tests can be carried out with a minimum of manipulative steps and supportive equipment.

Another object is to provide a test device including a container comprising at least one receptacle having an opening therein and adapted to carry a first test reagent, there being a closure member for sealing the opening of said receptacle to provide a closed reaction vessel, one of said receptacle and said closure member being adapted to carry a second test reagent.

Yet another object of this invention is to provide a test device of the aforementioned character having fastening means for maintaining said closure member in sealing engagement with the opening of said receptacle, finger tabs for aiding openings of said closure member, and an alignment means for guiding said closure member into sealing engagement with said opening.

Another object of this invention is to provide a test device of the above type which has a convenient circular configuration which enables it to rest upright on a flat surface to permit the introduction thereinto of an aliquot sample of fluid to be tested and which permits said device when closed to be held between the thumb and forefinger for shaking and thorough mixing of the reactants with the fluid sample.

Yet another object of this invention is to provide a unitary test device having a plurality of receptacles and complemental closure members adapted to contain reagents for carrying out quantitative immunological or chemical tests.

The test device of this invention has a wide range of utility. It can be used for conducting both organic and inorganic chemical testing as well as immunological testing wherein at least one pre-measured reactant is required for reaction with test sample. A primary employment of the test device is in its use in conducting immunological tests wherein the test result depends upon an agglutination or an inhibition of agglutination of an immunological reagent contained therein with the substance detected in the sample. Such a test for determining the presence of the pregnancy hormone, chorionic gonadotropin, in female urine is described in U.S. Patent No. 3,236,732 issued to E. A. Arquilla. The test device of the present invention is prepared for such a test, by dispensing a predetermined quantity of the antibody to chorionic gonadotropin into the receptacle of the test device container, dispensing a predetermined quantity of an indicator material into the closure member of said container and thereafter lyophilizing both reagents. For testing, an aliquot portion of a patient's urine sample is dispensed into the receptacle of the test device, with proper dilution when required. The closure member is then moved to closed position with respect to said receptacle, and the test device is vigorously shaken in order to mix the reagents with the sample aliquot. The test device may then be set aside and the result of the presence or absence of the pregnancy hormone in the urine sample may be interpreted from the appearance of the indicator material at a later time.

Other chemical and enzymatic tests may similarly be prepared by dispensing the required chemical reagents and indicators into the receptacle and/or the closure member of the test device container. Where only a single indicator reagent is needed it may be placed in a portion of the container, such as the closure, where it will remain out of contact with the sample until the closure member is in closed position immediately prior to mixing with the sample.

The container of the test device can also be used in other capacities such as for storing consumable items, e.g., food products; for molding or solidifying semi-solid products; or for storing relatively small articles used for testing of or replacement of parts in laboratory equipment. For such uses of a non-testing variety one modification of the container functions as an inexpensive, disposable package which has the advantage of providing of at least one space sealed from external environment in which a protective material, such as a desiccant may be placed.

The invention can best be understood by reference to the accompanying drawings illustrating several embodiments of the present invention:

Figure 1:
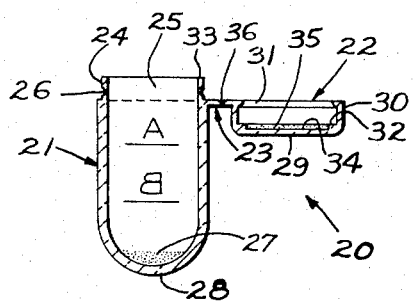
FIGURE 1 is a sectional view taken on the longitudinal axis of a first embodiment of the test device shown in open position.
Figure 2:
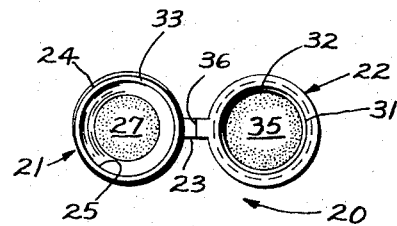
FIGURE 2 is a top plan view of the container of FIGURE 1.
Figure 3:
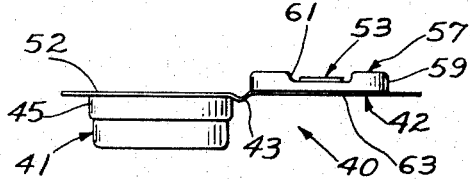
FIGURE 3 is a side view of another embodiment of the test device shown in open position.
Figure 4:
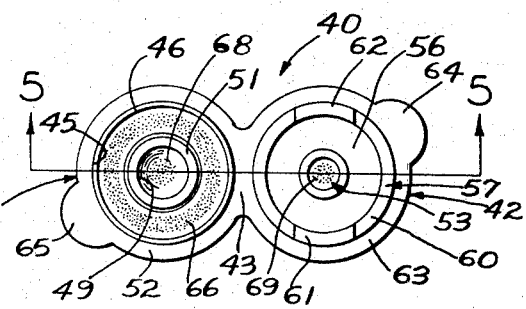
FIGURE 4 is a top plan view of the test device of FIGURE 3.
Figure 5:
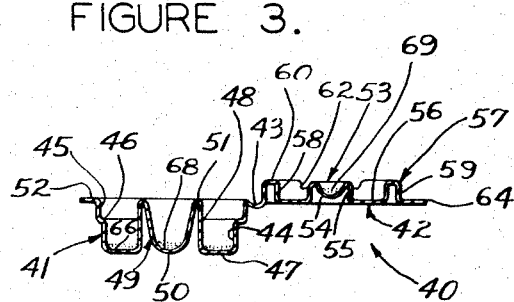
FIGURE 5 is a vertical sectional view of the container of FIGURES 3 and 4 taken on lines 5—5 of FIGURE 4.

Referring more particularly to FIGURES 1 and 2, the test device 20 selected for illustration therein comprises a container formed of a tubular receptacle 21 and a complemental cup-shaped closure member 22 connected by an integral flexible hinge strip 23 (FIGURE 2). The receptacle 21 has a reduced outer diameter neck portion 24, the inner surface of which forms a circular opening 25 at the top of said receptacle. An annular bead-receiving round bottomed recess or groove 26 is formed in the outer surface of neck 24 at the lower part thereof. A predetermined amount of a dried, adherent first reagent 27 is carried on the inner surface of the hemispherically shaped bottom 28 of the receptacle 21. If desired, appropriate markings, illustrated as a mirror image A and B (FIGURE 1), may be placed on the inner or outer side wall surface of the receptacle 21 to indicate the proper levels to which the container should be filled with a fluid sample for given tests.

The closure member 22 is formed with a relatively thin flat transverse wall portion 29 (FIGURE 1) and an annular side wall 30 which is provided at its outer end with a radially inwardly directed rounded annular fastener bead 31. The fastener bead 31 is cooperable with the bead-receiving recess 26 to provide a fastening means for retaining the closure member 22 in a closed position when moved thereto. An annular shoulder having flat annular sealing surface 32 (FIGURE 2) is formed within the closure member 22 and is adapted to contact the flat annular end surface 33 of the receptacle 21 to provide a fluid-tight seal when the closure member 22 is in closed position. Within the closure member 22 the annular sealing surface 32 surrounds a circular, shallow recess 34 which carries a predetermined quantity of a dried, adherent second reagent 35. If desired, one or both of the first reagent 27 and the second reagent 35 may be adhered to their respective carrier surfaces by a non-reactive bonding material which is soluble in the sample to be tested.

The hinge 23 is integrally attached at one end thereof to the exterior wall surface of the receptacle 21 at a position adjacent to and below the neck 24 and at the other end thereof to the edge portion of the closure side wall 30 adjacent the annular fastener bead 31 (FIGURE 1). A transverse V-shaped notch 36 (FIGURE 2) may be provided in the hinge 23 to promote the hinging action thereabout when the closure member 22 is moved to closed position on the receptacle 21. The length of end thereof to the edge portion of the closure side wall rectangular hinge 23 is such that it causes the closure member to approach the neck 24 in an optimal position for seating thereabout, and in this manner functions as an alignment means for aligning the annular fastener bead 31 with the neck 24 of the receptacle as the closure member is moved toward closed position by the user. As the closure member 22 is pressed onto the neck 24 the annular fastener bead 31 is forced into the groove 26 to provide an interlock between said closure member and said receptacle which insures a fluid-tight seal between the annular sealing surface 32 and the mating sealing surface 33. In closed position (not shown) the closure member 22 and the receptacle 21 form a sealed reaction vessel for the sample to be tested and the reagents 27 and 35.

The receptacle 21 and closure member 22 are preferably molded as a unitary article from a thermoplastic polymeric material which is flexible and at least translucent. Such material allows for structural bending and deformation and also allows for observation therewithin of the visible changes indicating the occurence of and/or the extent of a test reaction. A particularly preferred polymeric material is a vinyl chloride-vinyl ester copolymer having relative molar proportions of about 95:5, respectively, and blended with suitable plasticizers and stabilizers to attain an Izod impact strength of 0.30 foot-pound inches of notch (D–256 ASTM), a specific gravity of 1.35 (D–792 ASTM), a durometer hardness of 80±3 (D scale, D–785 ASTM), a tensile strength of 6700 pounds per square inch (D–638 ASTM), and a heat distortion at 140° F. of 84 pounds stress with a sag temperature of 135° F. (D–686 ASTM). Other polymeric materials which may be used are: vinyl chloride-vinyl acetate copolymer, other vinyl chloride containing copolymers, polyvinylidene chloride, cellulose acetate-propionate, cellulose acetate-butyrate, polyethylene, and polypropylene. The molding is accomplished by either injection techniques or vacuum forming.

The above polymeric substances allow the container to be at least translucent and, with most of the materials listed, transparent. Transparency is preferred since colorimetric or precipitation patterns can be seen more clearly when the container is used together with the necessary reagents as a chemical or immunological test device. These materials also allow a low cost container to be mass produced which is inexpensive enough to be disposable after each test has been performed therein. More rigid materials can be employed for making the receptacle 21 and the closure member 22 so long as the hinge 23 is constructed of a flexible material and the fastener bead 31 is made of compressible material to allow it to deform when being forced over the neck 24 of the receptacle 21.

When the test device is to be used to perform a test of the type described in U.S. Patent 3,236,732, the tubular receptacle 21 preferably has a length of about one inch and the reagents therefor are provided in the manner which will now be described. For the first reagent 27 a predetermined quantity of the antibody to chorionic gonadotropin in a liquid suspension agent is deposited in the receptacle 21, and for the second reagent 35 a predetermined quantity of carrier particles sensitized with chorionic gonadotropin is deposited in the closure member 22. The container is then placed in a lyophilization apparatus to remove the liquid therefrom at a low temperature. The resulting antibody and sensitized carrier particles 35 are then present in a dry state and adhere to the inner surfaces of the hemispherical bottom 28 of the receptacle 21 and of the closure member 22, respectively. By separating the antibody for chorionic gonadotropin from the sensitized carrier particles which function as an indicator material, more consistent results are obtained than when both are deposited as a mixture in a reaction vessel.

In use of the test device described, one drop of a urine sample is introduced into the receptacle 21, and two drops of water are then added and the closure member 22 is moved to closed position to provide a sealed reaction vessel as aforedescribed. The closed container is then vigorously shaken to thoroughly mix the reagents with the urine sample and is then placed in a suitable support rack in a vertical position. If an agglutination reaction as described in the above-mentioned patent takes place, it is evidence of a negative test result. If, on the other hand, the urine sample contains chorionic gonadotropin, the presence of which is indicative of the state of pregnancy, agglutination is inhibited and the sensitized indicator material will settle out and form a circular pattern of precipitate in the bottom of the receptacle 21. Once the observable indication has occurred and has been recorded, the test container may be discarded with the sample and reagents contained therein, thus eliminating the necessity for washing and sterilizing apparatus at the testing site, and also providing for sanitary disposal.

For other tests, particularly chemical tests, a reagent or mixture of reagents necessary to react with the substance being detected in the sample is deposited as the first reagent 27 in the receptacle 21, and any necessary indicator material is deposited as the second reagent 35 in the closure member 22. The testing may then be conducted in exactly the same manner as above described by adding a proper amount of sample to the receptacle 21, closing the test device, shaking, and thereafter reading the test result.

FIGURES 3 through 7 illustrate a preferred embodiment of the test device of the present invention. The container 40 of the test device shown in open position in FIGURES 3 to 5 and 7 comprises a circular container or base member 41 and a cooperable lid member 42 joined thereto by an integral thin flexible hinge portion 43. The base member 41 is generally cup-shaped having a cylindrical lower side wall portion 44 and a cylindrical upper side wall portion 45 of larger diameter defining an annular shoulder portion 46. The bottom wall 47 of the base member 41 is annular and the inner margin thereof is joined to an upstanding tubular wall portion 48 which at its upper end is joined to the upper end of a tubular receptacle portion 49 which tapers from its upper end to a reduced diameter rounded lower end portion 50. The juncture of the lip of the receptacle 49 with the tubular wall portion 48 is characterized by a flat annular upwardly facing sealing surface 51. An annular radially outwardly directed flange 52 projects from the upper edge of the cylindrical wall portion 45 and provides the hinge 43. It will be observed that the base member 41 provides integral support means for the receptacle portion 49 thereof, eliminating the need for the use of a supporting rack such as is required in the use of the embodiment of the invention shown in FIGURES 1 and 2.

The lid member 42 is formed with a centrally located closure member 53 comprising a generally heimspherical portion 54 which is joined at its margin to a tapered tubular wall portion 55. The wall portion 55 is joined by an annular transverse wall portion 56 to an upstanding annular fastener bead portion 57 of U-shaped cross-section. This fastener bead 57 has an inner cylindrical side wall 58 and an outer cylindrical side wall 59 which are connected at their upper edges by a flat, annular ring 60. The bead 57 is formed with portions of reduced height 61 and 62 in opposing relation along a diameter parallel with the axis of movement of the hinge 43 for a purpose to be hereinafter described.

A radially outwardly directed annular flange 63 projects from the lower edge of the bead wall 59 in substantially the same plane as the wall portion 56, the flange 52 and the sealing surface 51, joining the flange 52 at the hinge portion 43. The flange 63 of the lid portion 42 and the flange 52 of the base member 41 are formed with finger tabs 64 and 65, respectively, offset on opposite sides of a vertical plane through the centers of the receptacle 49 and the closure member 53, said plane being shown in FIGURE 4 as line 5—5.

Figure 6:
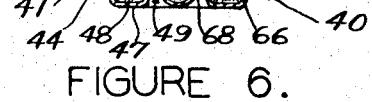
FIGURE 6 is a sectional view similar to FIGURE 5 but showing the device in closed position.
Figure 7:
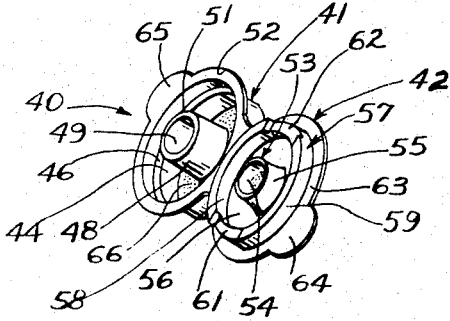
FIGURE 7 is a perspective plan view of the open container shown in FIGURE 3.
Figure 8:
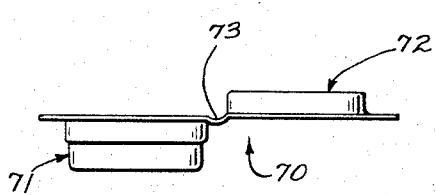
FIGURE 8 is a side view of a second embodiment of the test device shown in open position.

The hinge 43 is generally trough-shaped in cross-section (FIGURES 3 and 5) and is dimensioned so that upon moving the lid 42 toward the closed position shown in FIGURE 6 the outer side wall 59 of the fastener bead 57 engages the portion of the side wall portion 45 nearest the hinge prior to contact of the remainder of said fastener bead with the oppositely disposed portion of said side wall portion. After the lid portion 42 has been swung through the arc determined by the hinge 43 into a covering position over the base member 41 and the fastener bead 57 has been forced into continuous engagement with the side wall portion 45 the closure member 53 rests in a sealing engagement within the upper end of the receptacle 49 and the annular surface 51 sealingly engages the lid wall portion 56 as shown in FIGURE 6. In this manner side wall portion 45 provides a bead-receiving recess for fastener bead 57 and the two elements function as a fastening means. The hinge 43 thus functions as an alignment means for aligning the lid 42 and its associated closure member 53 with the base member 41 and the receptacle 49, respectively.

The fastener bead 57 has a sealing fit within the annular wall portion 45 and engages the shoulder 46, and the flange 63 overlies the flange 52 when the lid 42 is in the closed position shown in FIGURE 6. Upon movement to this position the lid portion 42 must flex slightly, and in order to permit such flexure the reduced height portions 61 and 62 are provided in the fastener bead 57. The discontinuities in the bead 57 provided by the portions 61 and 62 thereof locally reduce the rigidifying effect of the bead 57 so that as the lid portion 42 is pivoted about the hinge 43 into covering engagement with the base member 41 flexure of the lid portion 42 occurs along an axis parallel with the axis of the hinge 43 and passing through the center of closure member 53. When the portion of the bead 57 opposite the hinge 43 is forced into frictional contact with the cooperable portion of the annular wall portion 45, and into engagement with the adjacent portion of the shoulder 46, the middle part of the lid portion 42 is flexed upwardly along the described axis and the closure member 53 is not seated in the upper end of the receptacle 49. This buckled part is then completely flattened by forcing the same toward the support member 41, thereby seating the closure member 53 in the receptacle 49, seating the bead 57 on the shoulder 46 throughout the circumference thereof and forcing the bead 57 into tighter frictional contact with the annular wall 45. This increased frictional contact forms a fluid-tight seal between the bead 57 and the wall 45, and seating of the closure 53 within the upper end of the receptacle 49 provides a fluid-tight seal therebetween as well as a fluid-tight seal between the annular surface 51 of the receptacle 49 and the cooperable portion of the lid wall 56.

The container 40 when in the closed position of FIGURE 6 has a first closed space defined by the closure member 53 and the receptacle 49 and a second closed of a second dried, adherent reagent 69 is carried by the wall portions 44, 47 and 48 of the base member and wall 56 of the lid portion 42. This second closed space may be used to contain a desiccant 66 in order to maintain a low moisture content in the atmosphere therein. Since this second closed space is interposed between the first-mentioned closed space and the external environment the water vapor in any air which might seep into the container 40 will be absorbed by the desiccant 66 and will not tend to penetrate the seal for said first-mentioned closed space. For some uses other controlled atmospheric conditions may be desirable and if so, other appropriate materials may be substituted for the desiccant 66.

A predetermined amount of a first dried, adherent reagent 68 is carried by the hemispherically shaped bottom 50 of the receptacle 49 and a predetermined amount of a second dried, adherent reagent 69 is carried by the closure member 53. Both of these reagents may be the same as the reagents 27 and 35, respectively, of FIGURES 1 and 2 and are protectable against moisture, when desired, by the above mentioned desiccant 66.

The test device described by reference to FIGURES 3 through 7 is particularly preferred for conducting pregnancy testing of the type described above, since the support afforded by the base member 41 holds the receptacle 49 in a predetermined upright or vertical position on any flat surface. In use of the test device, an aliquot sample of a urine specimen is placed in the receptacle 49, diluted and mixed with the lyophilized antibody to chorionic gonadotropin carried in said receptacle as the reagent 68. The lid portion 42 is then forced into the closed position shown in FIGURE 6, and the closed test device is then thoroughly shaken to mix the indicator material carried by the closure member 53 as the second reagent 69 with the other material in the receptacle 49. Thereafter the test device is placed on any convenient flat surface for a prescribed time period after which the indicator pattern, if formed by reaction of the reagents with the sample, is read through the transparent material of said test device and recorded. The closed test device is then disposed of as a unit.

Another advantage presented by the test device illustrated in FIGURES 3 through 7 is that said device can be shipped in a partially or a fully closed position to protect the reagents carried therein from atmospheric conditions and yet can be conveniently opened by the finger tabs 64 and 65 at the site of ultimate use. If desired, reinforcing beads or ribs (not shown) may be integrally molded into various portions of the container 40, particularly in the cylindrical side wall 44 of the base member 41 for the purpose of increasing the structural strength of said member. Vertically aligned reinforcing beads are particularly desirable when the fastener bead 57 of the lid portion 42 has a tight fitting relationship with the base member 41. The additional strength provided by such beads prevents any collapse of the reinforced walls when the lid portion 42 is pressed into closed position with respect to the support member 41.

A preferential manner of manufacturing container 40 is to employ the above mentioned preferred vinyl chloride-vinyl ester copolymer in sheet form having a thickness of about 0.02 inch and vacuum-forming in a gang-type mold which produces a plurality of the containers 40 integrally joined along the plane of the flanges 52 and 63 by excess flashing material which can then be sheared away on a single plane shearer. Such molding permits mass production of the container 40 and insures low cost. The overall dimensions of the container 40 for the preferred use of constructing a pregnancy test device are such that the outer diameter of the annular fastener bead 57 is approximately 1 inch, while the height of the base member 41 from the bottom 50 to the top of rim 52 is slightly less than one-half inch.

The container 40, being of relatively small size, and inexpensively mass produced is particularly suited to use to a disposable test device of the type described. Another feature of the container 40 is that in closed or partially closed position it is relatively small and can be inserted into any of a number of available shipping bottles or foil wrappers which can be maintained air tight so that moisture is excluded therefrom. In this manner it is possible to package and ship reagents which arrive at the site of ultimate use free from ambient moisture problems. This feature is particularly important for world wide marketing of such test devices which requires packaging protecting the device against the moisture problems of tropical climates.

In addition to the above immunological reagents other test reagent systems such as enzyme controlled systems can be employed in the container 40. In one example, an enzyme preparation is deposited as the first reagent 68 and an indicator for the product of the reaction of the enzyme upon its substrate is deposited as the second reagent 69. An aliquot of a sample which is suspected of containing the substrate material is then added to the receptacle 49 and the device is held by lid 42 and agitated to mix the reagent 68 with the sample. After a prescribed period of incubation, the device is closed and vigorously shaken to mix the indicator reagent 69 with the reacting medium. Any color change, or other indication of the reaction is then noted either by eye in comparison with a furnished color chart or by an appropriate colorimetric instrument. It is notable that since the entire container 40 is molded from a flexible and transparent polymeric material the reaction medium can be viewed from either the top or the bottom as desired.

The hemispherical bottom 50 of the receptacle 49 is especially desirable when the container 40 is to be used in an immunological test device of the type described above. Where a simpler colorimetric test such as in the enzyme detection system example given above is to be conducted, any shape of bottom for the receptacle 49 is usable.

Figure 9:
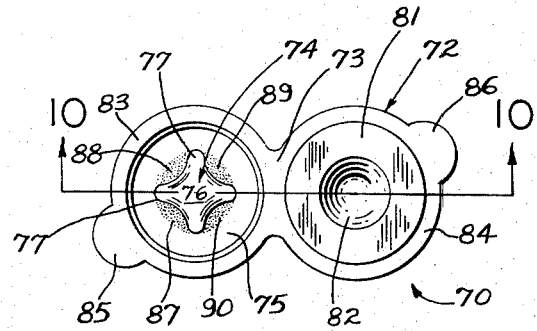
FIGURE 9 is a top plan view of the device of FIGURE 8.
Figure 10:
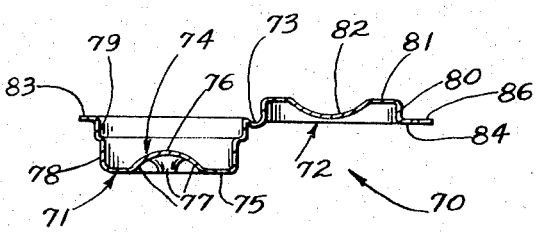
FIGURE 10 is a vertical sectional view of the container of FIGURES 8 and 9 taken on line 10—10 of FIGURE 9.
Figure 11:
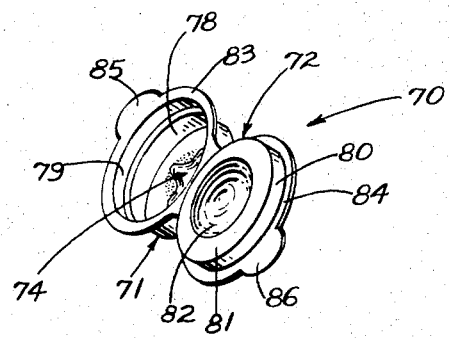
FIGURE 11 is a perspective plan view of the container of FIGURES 8 to 10.

Referring now to FIGURES 8 through 11, a modification of the container 40 is shown as a container 70. This container is particularly preferred where a number of reagent materials, greater than two, must necessarily be used in making up the test device. The container 70 comprises a circular, cup-shaped base member or receptacle 71 and a complemental circular closure member 72 connected through a thin flexible integral hinge 73. As shown in FIGURE 10, a centrally located raised divider 74 of rounded cruciform shape (FIGURE 9) is formed in the bottom wall 75 of receptacle 71 and comprises a central dome portion 76 and four radial arm portions 77 which are disposed at 90° to one another. The receptacle 71 has cylindrical side wall portions 78 and 79 corresponding to the side wall portions 44 and 45 of the base member 41 of container 40.

The closure member 72 is of inverted cup-shape, having a cylindrical side wall 80 and transverse wall 81 formed with a concentric circular dome-shaped depression 82. The receptacle 71 and closure 72 are formed with coplanar annular radially outwardly directed flanges 83 and 84, respectively, said flanges, in turn being formed with finger tabs 85 and 86 respectively. The flanges 83 and 84 merge to form the hinge 73 as shown in FIGURE 9. If a depression of larger diameter than the depression 82 illustrated is desired, the planar portion of the transverse wall 81 can be largely eliminated. Since the depression 82 of the closure member 72 is rounded in shape similar to the rounded bottom portions of the receptacles 21 and 49 previously described, the container 70 can be used for immunological test devices similar to those above described. When the container 70 is to be used for only colorimetric chemical tests no central depression 82 is needed in the transverse wall 81. For such tests the bottom wall 75 can be in the form of a flat plane so that the reaction medium is contained between two flat surfaces. Containers of this type when constructed from a transparent material are particularly suitable for use with a spectrophotometer by which the optical density of the reaction medium, and hence the extent of the reaction, may be determined.

The hinge 73 functions similarly to the hinge 43 of container 40. In addition to a hinging action, it provides during closing movement a guiding or aligning function whereby the cylindrical side wall 80 of said closure member 72 is guided into a proper sealing fit within the wall portion 79 of the receptacle 71 to form a fluid-tight seal between the surfaces of these cooperating and interfitting walls through frictional engagement. Thus the fastening means for container 70 consists of the cooperating surfaces on said receptacle 71 and said closure member 72.

The raised divider 74 separates the bottom of receptacle 71 roughly into four areas adapted to accommodate four reagents 87, 88, 89 and 90 as shown in FIGURE 9. If desired, the divider 74 can take the form of a ridge or bead extending diametrically across the bottom wall 75 of the receptacle 71 to provide only two reagent-accommodating areas, or it may take a star-shaped form defining any desired number of peripherally disposed reagent-accommodating areas. In this manner any suitable or desired number of reagents can be dispensed into, stored, and shipped in the container 70. If desired, the raised divider 74 may be replaced by a series of downwardly offset dimples or other suitable depressions formed in the bottom wall 75 to separately accommodate a number of inter-reactable reagents.

The test device illustrated in FIGURES 8 through 11 with the necessary reagents in the reagent-containing areas of the container 70 is packaged with the closure member 72 fully or partially closed. The user then opens the device when necessary and adds the specimen to the receptacle 71, allowing the reagents therein to come into contact with the sample which acts as a solvent for all the reagents. The closure member 72 is then closed over the receptacle 71 and the test device is shaken to mix the contents thereof. Depending upon the test performed the results may be read by placing the closed test device on a flat surface in the position shown in FIGURES 8 and 10. Alternatively it may be inverted to allow any precipitated material to form an observable pattern in the rounded depression 82. This latter manner of observing the test result is particularly preferred for the above described immunological test system. It will be observed that when inverted the test device rests on the flange 84 of the closure 72 which serves as a stable support means therefor and supports depression 82 in a predetermined vertical position.

The container 70 may be molded from the materials and by the techniques above mentioned with respect to the container 40. It is likewise inexpensive to produce and is disposable after use.

Figure 12:
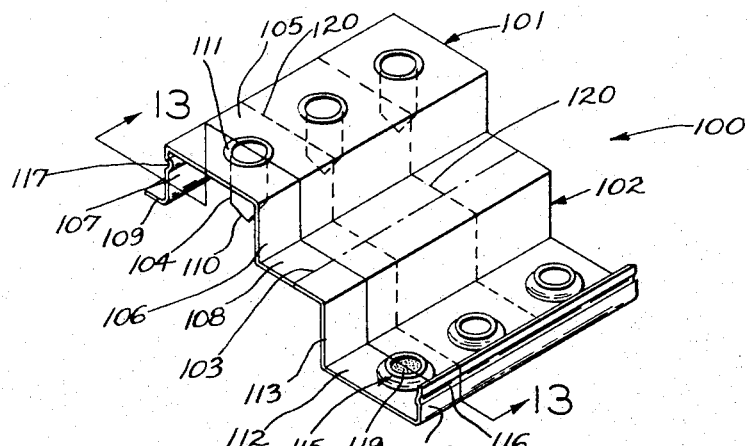
FIGURE 12 is a perspective plan view of a third embodiment of the test device shown in open position, said device having a plurality of receptacles and corresponding closure members.
Figure 13:
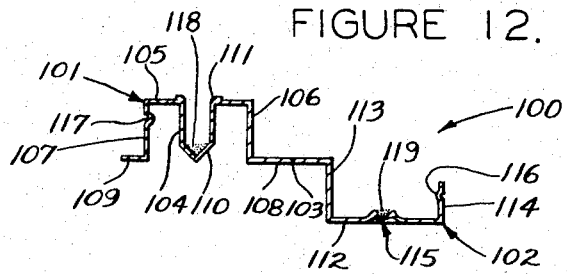
FIGURE 13 is a vertical sectional view taken on line 13—13 of FIGURE 12.
Figure 14:
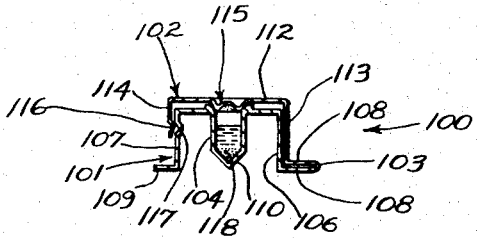
FIGURE 14 is a sectional view similar to FIGURE 13 showing the test device in closed position.

Another embodiment of the test device of the present invention is shown in FIGURES 12, 13 and 14 wherein a plurality of test devices are joined one to another at weakened tear-lines and can be detached for individual use or maintained in a joined series permitting a plurality of tests to be run simultaneously.

Each of the test devices in FIGURES 12 to 14 includes a container 100 which comprises a base member 101 and an integral cooperable cover member 102 joined thereto for pivotal movement about an axis 103. The base member 101 includes a tubular receptacle 104 depending from a central portion of a transverse wall 105 having supporting walls 106 and 107 joined thereto at opposite edges thereof. Coplanar flanges 108 and 109 extend in opposite outward directions from the bottom edges of the walls 106 and 107, respectively. The receptacle 104 is shown as having a conical bottom 110 and an annular mouth portion or opening 111 which is raised somewhat above the upper surface of the transverse wall 105. The flange 108 can be folded upon itself along the axis 103 and provides a hinge joining the base member 101 and the cover member 102.

The cover member 102 comprises a transverse wall 112 and a pair of side walls 113 and 114 normal thereto, the wall 113 being joined to the flange 108 as shown. The transverse wall 112 is formed with a centrally disposed raised circular concave closure member 115. The cover member 102 can be moved to the closed position shown in FIGURE 14 by pivoting about the axis 103 during which the hinge flange 108 serves as an alignment means for the receptacle 104 and the closure member 115. The wall 114 is formed with a rounded fastener bead 116 which is configured to fit into and be retained by a rounded bead-receiving groove 117 formed in the support wall 107 when the container 100 is in the closed position of FIGURE 14, thereby retaining the cover 102 in closed position when moved thereto.

A first dried, adherent reagent 118 is disposed within the bottom of the receptacle 104, while a second dried, adherent reagent 119 is carried in the concavity of the closure member 115 as shown in FIGURE 13. In use of the test device an aliquot of a liquid sample to be tested is added to the receptacle 104 and the cover member 102 is pivoted toward closed position. As the closure member 115 is forced into sealing engagement with the raised mouth portion 111 of the receptacle 104, the fastener bead 116 slips into the bead-receiving groove 117. The closed container 100 then exhibits the cross sectional configuration shown by FIGURE 14, which has been illustrated with a liquid specimen in receptacle 104. The closed container 100 affords a vessel for reaction of the liquid specimen with the reagents 118 and 119 and when placed upon a horizontal surface in the position shown provides means supporting the receptacle 104 in a predetermined vertical position in which the test results may be viewed.

As stated above, the container 100 is preferably constructed as one of a multiple of containers joined through tear-lines 120. A series of the containers 100 can be conveniently molded from a sheet of thermoplastic material by vacuum-forming. If a quantitative test is desired to be run on a patient's urine specimen in order to determine the titre or concentration of chorionic gonadotropin in the urine specimen, nine connected containers 100 may be employed to conduct the test procedure set out in the description of Table II of U.S. Patent No. 3,236,732 wherein varying amounts of the antibody of chorionic gonadotropin are disposed within the successive receptacles 104 and wherein the same amount of the indicator material is disposed in the concavities of the corresponding closure members 115. The closure members 115 are simultaneously closed over the receptacles 104 after the addition of a standard amount of the same urine specimen to each of said receptacles. After shaking and allowing the resulting mixtures to stand, the patterns exhibited indicate the titre of the chorionic gonadotropin in the urine sample. In the referenced Table II, the titre of the chorionic gonadotropin in the urine sample is $1/800$ and is shown by the last receptacle in which an agglutination or a non-precipitated pattern is exhibited, which would be the third receptacle of the series.

Figure 15:
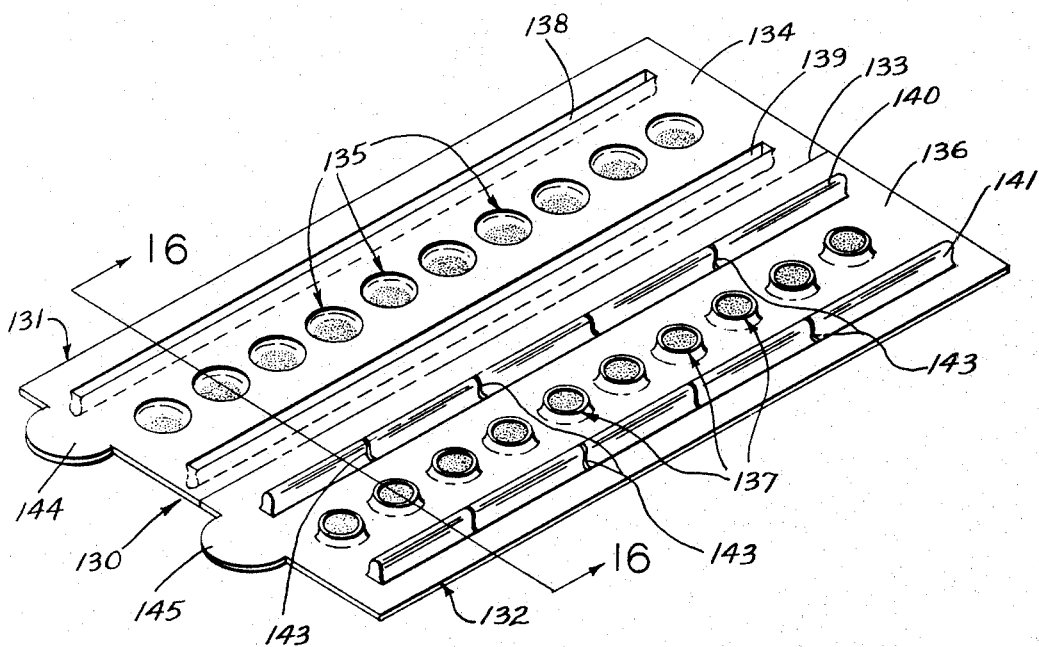
FIGURE 15 is a perspective plan view of a fourth embodiment of the test device shown in open position, said device also having a plurality of receptacles and corresponding closure members.
Figure 16:
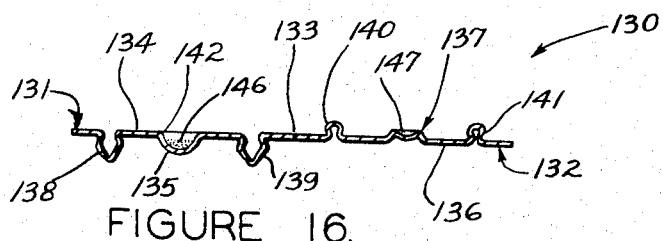
FIGURE 16 is a vertical sectional view of the test device of FIGURE 15 taken on line 16—16.
Figure 17:
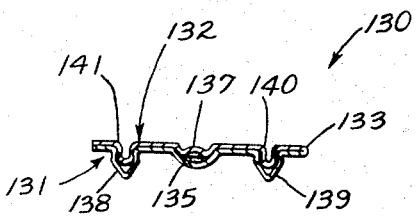
FIGURE 17 is a sectional view similar to FIGURE 16 showing the test device in closed position.

Another series test device for quantitative testing is shown in FIGURES 15 to 17. In this embodiment of the invention a unitary multiple receptacle container 130 comprises a base member 131 and a cooperable cover member 132 joined thereto for pivotal movement about an axis 133. The base member 131 includes an elongated flat wall 134 formed with a plurality of hemispherically-shaped spaced receptacles 135 disposed in a longitudinal row. The cover member 132 comprises an elongated flat wall 136 joined to wall 134 along a fold line which lies on the axis 133 and is formed with a plurality of raised concave closure members 137 disposed in a longitudinal row and transversely aligned with the receptacles 135.

The base member wall 134 is formed with two bead-receiving recesses or troughs 138 and 139 positioned along the entire length of the row of the receptacles 135 and spaced on opposite sides therefrom. The cover member wall 136 is formed with a pair of spaced upstanding longitudinally extending fastener beads 140 and 141 which are bulb-shaped in cross-section (FIGURE 16) and are adapted to be received and retained in the troughs 139 and 138, respectively, when the cover member 132 is moved to the closed position shown in FIGURE 17. The receptacles 135 and closure members 137 are positioned equidistance from the axis 133 so that upon closing the test device, the row of the closure members 137 sealingly seat within the sloping mouth portions 142 of corresponding receptacles 135 as the fastener beads are forced into the bead-receiving troughs. Fastener beads 140 and 141 and bead-receiving troughs 138 and 139 thus function as a fastening means for retaining cover member 132 over base member 131 when said beads rest in said troughs.

The fastener beads 140 and 141 are shown (FIGURE 15) as being formed with a number of discontinuities 143 separating said beads into a plurality of sections which function to allow said beads to be more easily forced into the bead-receiving troughs 138 and 139. These discontinuities 143 are shown spaced at intervals providing bead sections of a length to span two receptacles, however, any suitable or desired number of these discontinuities can be utilized. A first arcuate-shaped finger tab 144 is integrally formed on one end of the base member wall 134 at a position remote from the axis 133, while a second mated finger tab 145 is integrally formed on the cover member wall 136 in a position such that when the cover member 132 is in closed position the finger tabs 144 and 145 are adjacent but do not substantially overlap one another. By exerting suitable forces on the finger tabs the cover member 132 may be pried from the closed position of FIGURE 17 against the retaining action of the fastener beads 140 and 141 and bead-receiving troughs 138 and 139.

The composite container 130 can be molded by vacuum-forming from any suitable polymeric materials and can be sheared on a common plane since the rectangular walls 134 and 136 can be formed from the same sheet of polymeric material. Similar dimensions and thickness of material as employed for the previously described containers can be employed for the container 130. Suitable reagents 146 and 147 are carried by the receptacles 135 and closure members 137, respectively, and the hemispherical shape of the receptacles 135 permits observation of immunological agglutination reactions carried out therein. If strictly colorimetric chemical determinations are to be made in the container 130 the hemispherical shape of the receptacles is not necessary and any particular shape desired is usable. Also observable in FIGURE 17 is the fact that the bead-receiving troughs 138 and 139 function as a support means for the container 130 such that when said container is placed on a horizontal surface, such as a laboratory bench top, the receptacles 135 are disposed in the upright position shown.

If desired transverse tear-lines (not shown) may be provided as in the form of the invention shown in FIGURES 12 to 14 permitting separation of one or more receptacles 135 and cooperable closure members 137 as desired.

In summary, the test device of the present invention and its container can be manufactured in a number of different modifications either as single or composite units from inexpensive materials making disposal thereof after use practical. The disclosed containers may be used to accommodate various materials and are especially well adapted for use in carrying out chemical and immunological tests.

What is claimed is:

1. In combination, at least one receptacle having an opening therein, a predetermined amount of a first reagent within said receptacle, a closure member movable between opened and closed positions with respect to said receptacle opening, said closure member when in said closed position sealing said opening, and a predetermined amount of a second reagent carried by one of said closure member and said receptacle in a position to remain out of contact with said first reagent and to be exposed within said receptacle when said closure member is in said closed position.

2. The combination of claim 1 including a support means for supporting said receptacle and closure member in a predetermined vertical position, said support means integrally attached to one of said closure member and said receptacle, an alignment means connected between said closure member and said receptacle for guiding said closure member into said closed position, and including a first finger tab connected to said receptacle and a second finger tab connected to said closure member.

3. The combination of claim 1 including a fastening means connected to said receptacle and said closure member for maintaining said closure member in sealing engagement with said receptacle opening when in said closed position.

4. The combination of claim 3 wherein said fastening means comprises at least one fastener bead attached to said closure member and at least one cooperating bead-receiving recess connected to said receptacle and adapted to frictionally engaging and retaining said fastener bead when said closure member is in said closed position.

5. The combination of claim 1 wherein at least one of said closure member and said receptacle has a hemispherically-shaped recess therein.

6. The combination of claim 1 including a support means for supporting said receptacle in a predetermined vertical position, said support means integrally attached to and disposed about said receptacle, and including a fastening means for maintaining said closure member in sealing engagement with said receptacle opening, said fastening means comprising at least one fastener bead attached to said closure member and at least one cooperating bead-receiving recess integral with said support means and adapted to frictionally engaging and retaining said fastener bead when said closure member is in said closed position, and said fastening means being constructed of a flexible and a resilient material whereby structural deformation of said fastener bead and said bead-receiving recess is permitted when said closure member is moved to said closed position.

7. The combination of claim 1 including at least one additional receptacle having an opening therein, said first reagent present in said additional receptacle in an amount different from the amount contained in said first receptacle, a corresponding closure member movable between opened and closed positions with respect to said opening of said additional receptacle and said corresponding closure member when in said closed position sealing said opening, and said second reagent present in one of said additional receptacle and said corresponding closure member in an amount different from the amount contained in said first receptacle and closure member and carried in a position to remain out of contact with said first reagent in said additional receptacle and to be exposed within said additional receptacle when said corresponding closure member is in said closed position.

8. In combination at least one receptacle containing a first reagent and having an opening therein, a closure member movable between opened and closed positions with respect to said receptacle opening, said closure member when in said closed position sealing said opening, support means integral with one of said receptacle and said closure member for supporting said receptacle and said closure member in the predetermined vertical position, and one of said closure member and said receptacle adapted to carry a second reagent in a position to remain out of contact with said first reagent and to be exposed within said receptacle when said closure member is in said closed position.

9. The combination of claim 8 including a fastening means connected to said receptacle and said closure member for maintaining said closure member in sealing engagement with said receptacle opening when in said closed position.

10. The combination of claim 9 wherein said fastening means comprises at least one fastener bead attached to said closure member and a cooperating bead-receiving recess integral with said receptacle for frictionally engaging and retaining said fastener bead when said closure member is in said closed position.

11. The combination of claim 8 including a fastening means connected to said receptacle and said closure member for maintaining said closure member in sealing engagement with said receptacle opening when in said closed position and wherein said fastening means is constructed of a flexible and resilient material and comprises at least one fastener bead attached to said closure member and a cooperating bead-receiving recess integral with said receptacle for frictionally engaging and retaining said fastener bead, and said fastener bead having at least one discontinuity therein to permit deformation of said fastener bead when entering said bead-receiving recess and to remain under deformation forces when engaged therewith to secure said fastener bead within said bead-receiving recess.

12. The combination of claim 8 wherein said support means comprises a surrounding wall connected to said receptacle about said opening, a bead-receiving recess integrally affixed to said wall, a fastener bead attached to said closure member and adapted to frictionally engage and be retained by said bead-receiving recess when said closure member is in said closed position, and whereby said fastener bead and said bead-receiving recess cooperate to maintain said closure member in sealing engagement with said receptacle opening.

13. In combination at least one receptacle adapted to contain a first reagent and having an opening therein, a closure member movable between opened and closed positions with respect to said receptacle opening, said closure member when in said closed position sealing said opening, support means integral with one of said receptacle and said closure member for supporting said receptacle and said closure member in a predetermined vertical position, one of said closure member and said receptacle adapted to carry a second reagent in a position to remain out of contact with said first reagent and to be exposed within said receptacle when said closure member is in said closed position, said support means comprising a depending, surrounding tubular wall connected by one end thereof to said receptacle opening, an annular bottom wall connected by the inner margin thereof to the opposite end of said tubular wall, a surrounding cylindrical side wall portion connected to the outer margin of said annular bottom wall and extending therefrom in the direction of said tubular wall to approximately the plane of said receptacle opening and, a bead-receiving recess formed in the upper end of said surrounding side wall portion, and wherein said closure member is supported by an annular transverse wall portion having an annular fastener bead integrally affixed thereto and adapted to frictionally engage and be retained by said bead-receiving recess to form a fluid-tight seal therebetween when said closure member is in said closed position, and wherein a hinge integrally connects said integral transverse wall portion to said surrounding side wall portion.

14. In combination at least one receptacle adapted to contain a first reagent and having an opening therein, a closure member movable between opened and closed positions with respect to said receptacle opening, said closure member when in said closed position sealing said opening, support means integral with one of said receptacle and said closure member for supporting said receptacle and said closure member in a predetermined vertical position, one of said closure member and said receptacle adapted to carry a second reagent in a position to remain out of contact with said first reagent and to be exposed within said receptacle when said closure member is in said closed position, said support means comprising a depending, surrounding tubular wall connected by one end thereof to said receptacle opening, an annular bottom wall connected by the inner margin thereof to the opposite end of said tubular wall, a surrounding cylindrical side wall portion connected to the outer margin of said annular bottom wall and extending therefrom in the direction of said tubular wall to approximately the plane of said receptacle opening and, a bead-receiving recess formed in the upper end of said surrounding side wall portion, and wherein said closure member is supported by an annular transverse wall portion having an annular fastener bead integrally affixed thereto and adapted to frictionally engage and be retained by said bead-receiving recess to form a fluid-tight seal therebetween when said closure member is in said closed position, and wherein a hinge integrally connects said integral transverse wall portion to said surrounding side wall portion, said fastener bead having at least two discontinuities therein positioned in a line intersecting the center of said closure member and parallel to the axis of said hinge to permit said fastener bead to deform when entering bead-receiving recess and to remain under deformation forces when engaged therewith to secure said fastener bead in said surrounding side wall portion, and wherein said hinge is positioned to force a first portion of said fastener bead into engagement with the portion of said bead-receiving recess nearest to said hinge prior to contact of the diametrically opposite portion of said fastener bead with the portion of said bead-receiving recess furthest removed from said hinge.

15. In combination at least one receptacle adapted to contain a first reagent and having an opening therein, a closure member movable between opened and closed positions with respect to said receptacle opening, said closure member when in said closed position sealing said opening, support means integral with one of said receptacle and said closure member for supporting said receptacle and said closure member in a predetermined verticale position, one of said closure member and said receptacle adapted to carry a second reagent in a position to remain out of contact with said first reagent and to be exposed within said receptacle when said closure member is in said closed position, said support means comprising a wall connected to said receptacle about said opening, and at least two bead-receiving recesses attached to said wall and extending downwardly therefrom beyond the bottom of said receptacle, and wherein said closure member has attached thereto at least two fastener beads adapted to frictionally engage one each of said bead-receiving recesses when said closure member is in said closed position with respect to said receptacle opening.

16. The combination of claim 8 including a plurality of receptacles and a plurality of closure members, and wherein said support means comprises a wall connected to said receptacles about the openings thereof, and at least two bead-receiving recesses attached to said wall and extending downwardly therefrom beyond the bottom of said receptacles, and wherein said closure members have attached thereto at least two fastener beads adapted to frictionally engage one each of said bead-receiving recesses when said closure member is in said closed position with respect to said receptacle opening.

17. The combination of claim 1 including fastening means on said receptacle and said closure member for maintaining said closure member in sealing engagement with said receptacle opening when in said closed position.

18. The combination of claim 17 wherein said fastening means comprises cooperating surfaces on said receptacle and said closure member adapted for frictional engagement.

19. The combination of claim 17 wherein said fastening means comprises interfitting, substantially cylindrical, surfaces on said receptacle and said closure member adapted to form a fluid-tight seal between said receptacle and said closure member.

References Cited

UNITED STATES PATENTS

| | | | |
|---|---|---|---|
| 2,798,631 | 7/1957 | Engel | 220—60 |
| 2,844,244 | 7/1958 | Hanson | 206—17 |
| 3,082,903 | 3/1963 | Stevens et al. | 229—2.5 |
| 3,139,208 | 6/1964 | Irwin et al. | 220—38.5 |
| 3,164,478 | 1/1965 | Bostrom | 229—2.5 |
| 3,252,683 | 5/1966 | Uetzmann. | |
| 3,311,229 | 3/1967 | Troll et al. | 220—60 |

FOREIGN PATENTS 1,129,884  5/1962  Germany.

WILLIAM T. DIXSON, Jr., *Primary Examiner.*

U.S. Cl. X.R.

167—84.5; 206—56; 220—23, 60